United States Patent
Skog et al.

(10) Patent No.: US 8,064,186 B2
(45) Date of Patent: Nov. 22, 2011

(54) METHOD OF MANUFACTURING CAPACITIVE ELEMENTS FOR A CAPACITIVE DEVICE

(75) Inventors: Terje Skog, Nykirke (NO); Svein Moller Nilsen, Holmestrand (NO)

(73) Assignee: Infineon Technologies AG, Neubiberg (DE)

( * ) Notice: Subject to any disclaimer, the term of this patent is extended or adjusted under 35 U.S.C. 154(b) by 846 days.

(21) Appl. No.: 12/129,259

(22) Filed: May 29, 2008

(65) Prior Publication Data

US 2008/0297974 A1    Dec. 4, 2008

(30) Foreign Application Priority Data

May 31, 2007    (EP) .................... 07109362

(51) Int. Cl.
*H01G 5/00*    (2006.01)
(52) U.S. Cl. ..... 361/277; 361/278; 361/279; 361/283.3; 361/290
(58) Field of Classification Search ............. 361/277, 361/272–273, 278–279, 283.3, 287, 290, 361/292; 333/186, 188
See application file for complete search history.

(56) References Cited

U.S. PATENT DOCUMENTS

| | | | |
|---|---|---|---|
| 6,122,964 A * | 9/2000 | Mohaupt et al. ........... | 73/514.32 |
| 6,490,147 B2 * | 12/2002 | Yoon et al. ................. | 361/298.3 |
| 6,556,415 B1 * | 4/2003 | Lee et al. .................... | 361/277 |
| 6,954,348 B1 | 10/2005 | Rodgers | |
| 7,268,646 B2 * | 9/2007 | Lutz et al. ................... | 333/186 |
| 7,352,040 B2 * | 4/2008 | Partridge et al. ............. | 257/419 |
| 2006/0054983 A1 | 3/2006 | Acar et al. | |

FOREIGN PATENT DOCUMENTS

WO    0219509 A2    3/2002

* cited by examiner

*Primary Examiner* — Nguyen T Ha
(74) *Attorney, Agent, or Firm* — Eschweiler & Associates, LLC

(57) ABSTRACT

A method of manufacturing capacitive elements for a capacitive device which comprises one or more layers is provided. At least one layer is etched from a first surface to a second surface thereof to form two sections of the layer, such that the sections are movable relative to one another, and such that a wall extending from the first surface to the second surface is formed on each of the two sections, the walls defining a gap therebetween. An etching step forms multiple recesses in each wall such that multiple capacitive elements are defined between adjacent recesses, the capacitive elements of one wall being offset from those of the other wall when the sections are stationary with respect to one another. A corresponding capacitive device is also provided.

9 Claims, 14 Drawing Sheets

METHOD OF MANUFACTURING CAPACITIVE ELEMENTS FOR A CAPACITIVE DEVICE

CROSS REFERENCE TO RELATED APPLICATIONS

This application claims priority under 35 U.S.C. §119 to Application No. EP 07109362.9 filed on May 31, 2007, entitled "Method of Manufacturing Capacitive Elements for a Capacitive Device," the entire contents of which are hereby incorporated by reference.

FIELD OF THE INVENTION

The present invention relates to a method of manufacturing capacitive elements for a capacitive device.

BACKGROUND

Micro electromechanical systems (MEMS) structures used to facilitate variable capacitances are often finger-structures that move relative to each other, as shown in FIG. 1. A moveable section 1 and a stationary section 2 are separated by a gap 3. When such movable fingers 1 move deeper in between stationary fingers (that is, the overlapping area of the sections increases) the resultant capacitance increases. FIG. 2 shows the movable section 1 of a capacitive finger to the left and a stationary section 2 to the right with a gap 3 between the sections 1, 2. The movable part must be insulated from the stationary part.

Known MEMS structures use their free-etched movable parts as capacitive areas. These areas have one single conductor and are restricted to gap clearances that can be achieved with the aspect ratio of deep etching.

However, the capacitances achieved by known devices are limited by the aspect ratio possible by deep etching, since this will dictate the clearance between the parts. A single conductor or capacitive trace limits the frequency of the capacitive output for harvesting electrical charges for each passing of an electrode pair, while relatively small movements do not provide a sufficiently large capacitive signal.

According to the present invention there is provided a method of manufacturing capacitive elements for a capacitive device, the device comprising one or more layers, the method comprising the steps of:

etching from a first surface to a second surface of at least one layer to form two sections of the layer, such that the sections are movable relative to one another, and such that a wall extending from the first surface to the second surface is formed on each of the two sections, the walls defining a gap therebetween; and etching to form multiple recesses in connection with each wall such that multiple capacitive elements are defined between adjacent recesses, the multiple capacitive elements of one wall being offset from those of the other wall when the sections are stationary with respect to one another.

The invention further provides a capacitive device comprising at least one layer having two sections, such that the sections are movable relative to one another, and such that a wall extending from a first surface to a second surface of the layer is formed on each of the two sections, the walls defining a gap therebetween;

wherein each section of the layer comprises multiple recesses in connection with each wall such that multiple capacitive elements are defined between adjacent recesses, the capacitive elements of one wall being offset from those of the other wall when the sections are stationary with respect to one another.

The invention is advantageous in that the capacitive surfaces are brought closer together that was traditionally achievable. The provision of multiple capacitive elements increases the frequency of the capacitive output for harvesting electrical charges. A larger capacitive signal is gained from a relatively small movement.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
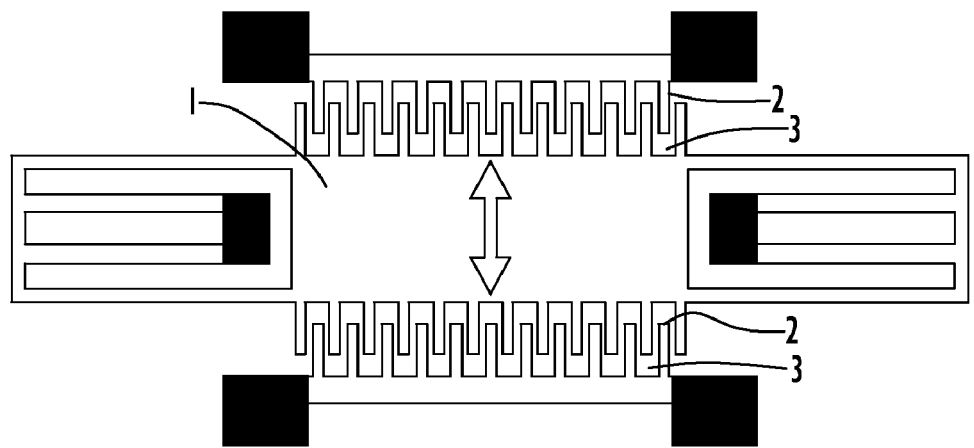
FIG. 1 shows a plan view of a known capacitive structure having a variable capacitor formed of moving and stationary wafer sections.
Figure 2:
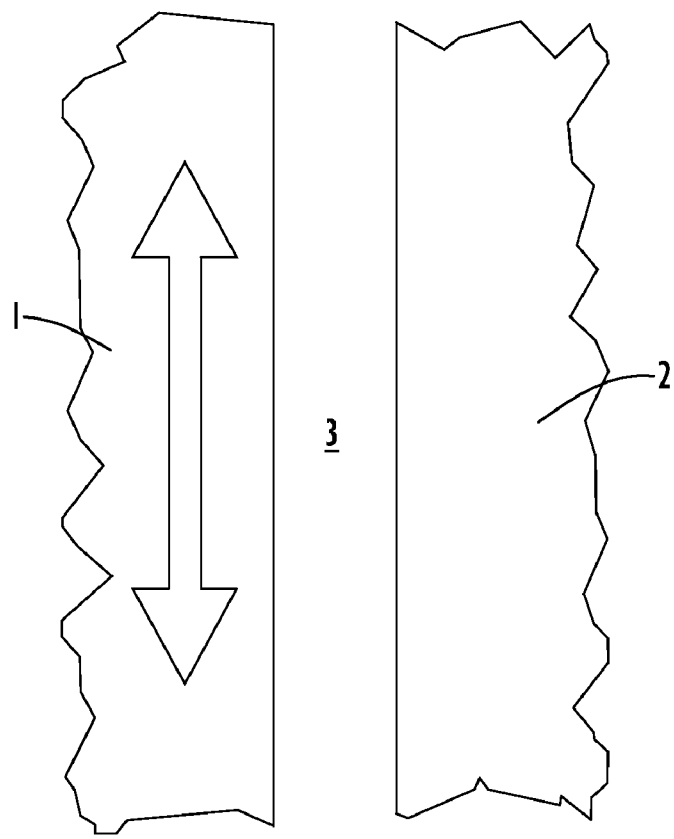
FIG. 2 shows a close-up plan view of moveable and stationary sections of the structure of FIG. 1.
Figure 3:
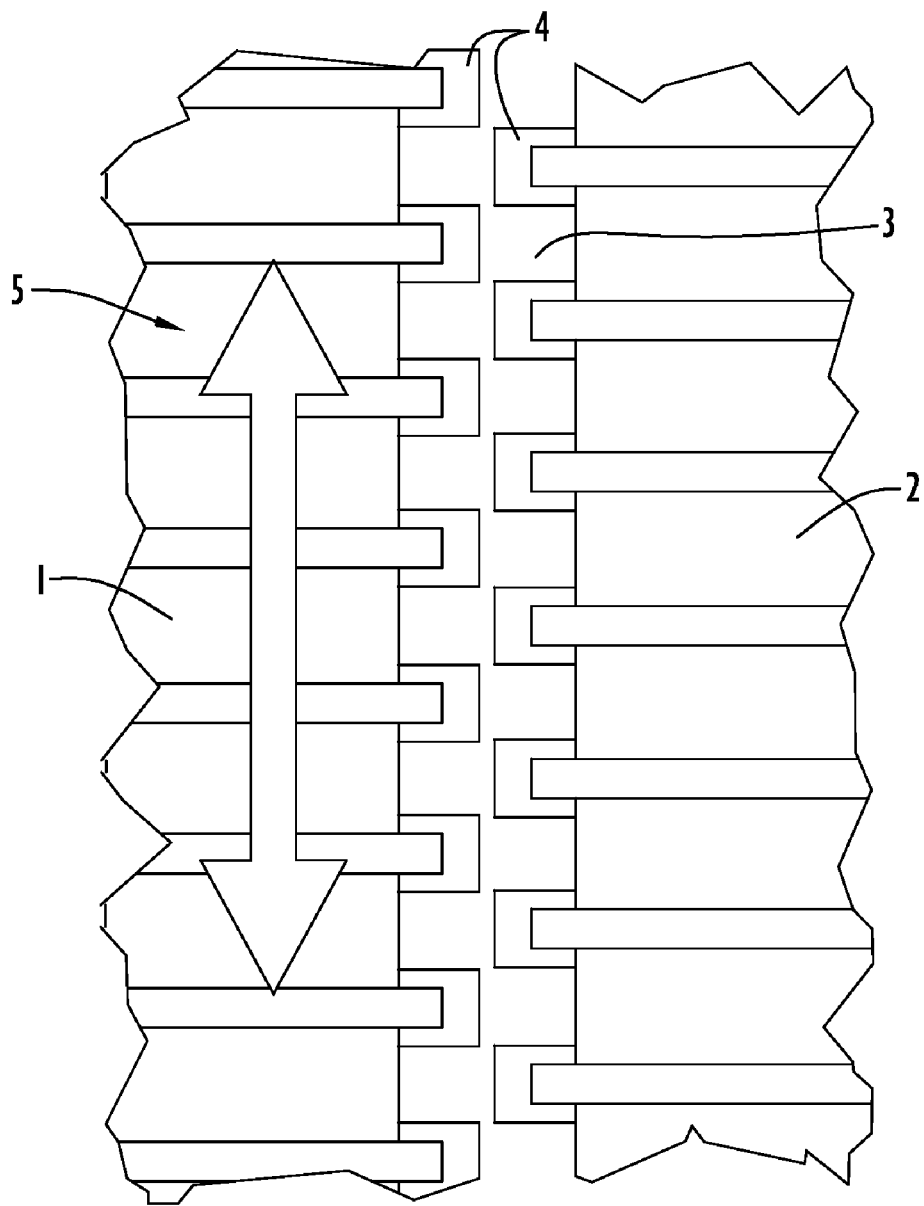
FIG. 3 is a plan view of a portion of a capacitive structure having a variable capacitor formed of moving and stationary wafer sections with staggered capacitive traces, according to an embodiment of the invention.

Referring to FIG. 3, an embodiment of the invention is shown in which adjacent wafer sections 1, 2 have substantially vertical conductive traces 4 that have been applied in an etched out space or channel 3 between a top surface 5 and a bottom surface (not shown) of the moving 1 (shown on the left hand side) and the stationary 2 (shown on the right hand side) wafer sections. The wafer may be formed of a semiconductor material. These conductive traces 4 are produced in a staggered manner, so that when the movable section 1 moves, for example due to the application of an external force, the resultant clearance between conductive traces 4 of adjacent sections is smaller than that which would result from the etched out straight channel or gap 3 alone. The conductive traces 4 will also give a larger capacitive change for a relatively small movement. The pulses that are produced make it easier to harvest the electrical charges from random movements. Separate conductors 4 make it possible to control each capacitive pad for various types of applications, for instance, actuators.

The conductive traces 4 are manufactured in a number of ways, examples of which are described below.

Figure 4:
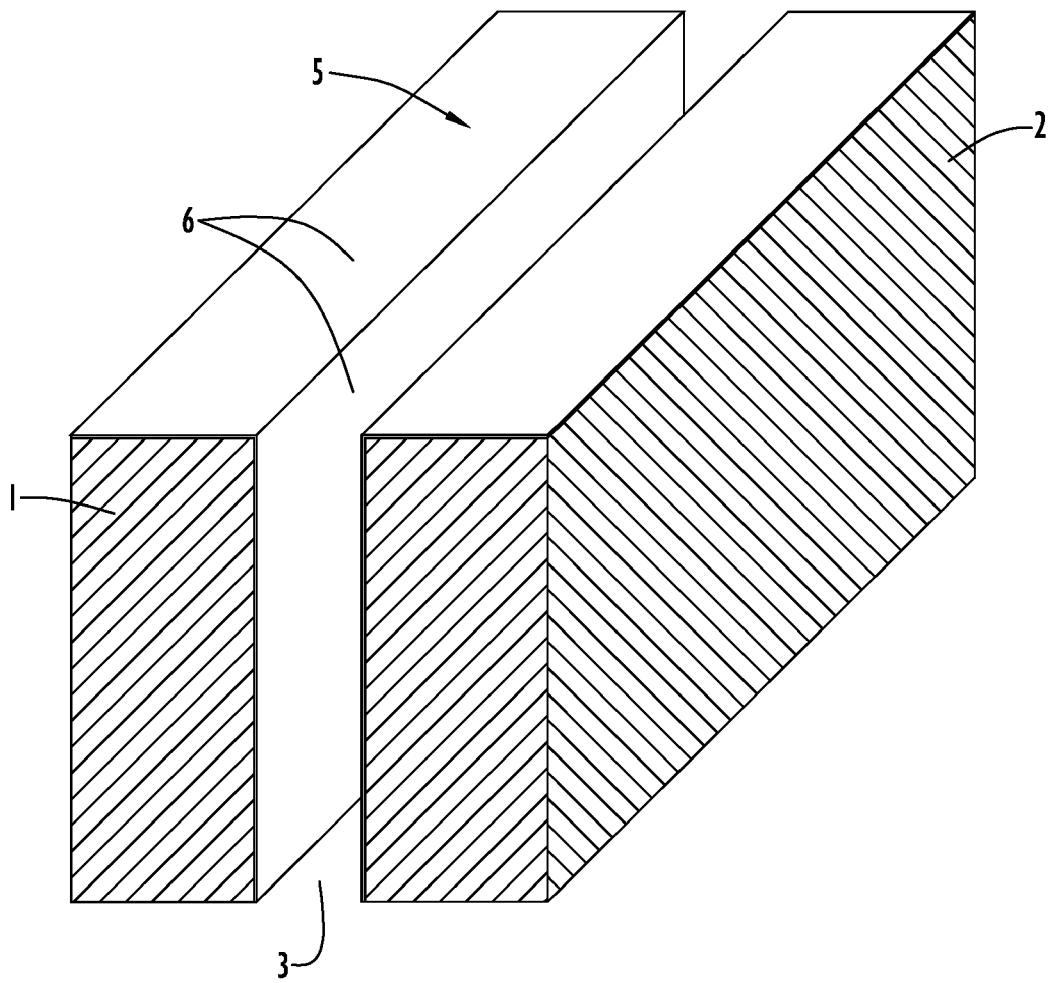
FIGS. 4 to 8 show perspective views of the structure of FIG. 3 during each step of a manufacturing method according to the invention.
Figure 5:
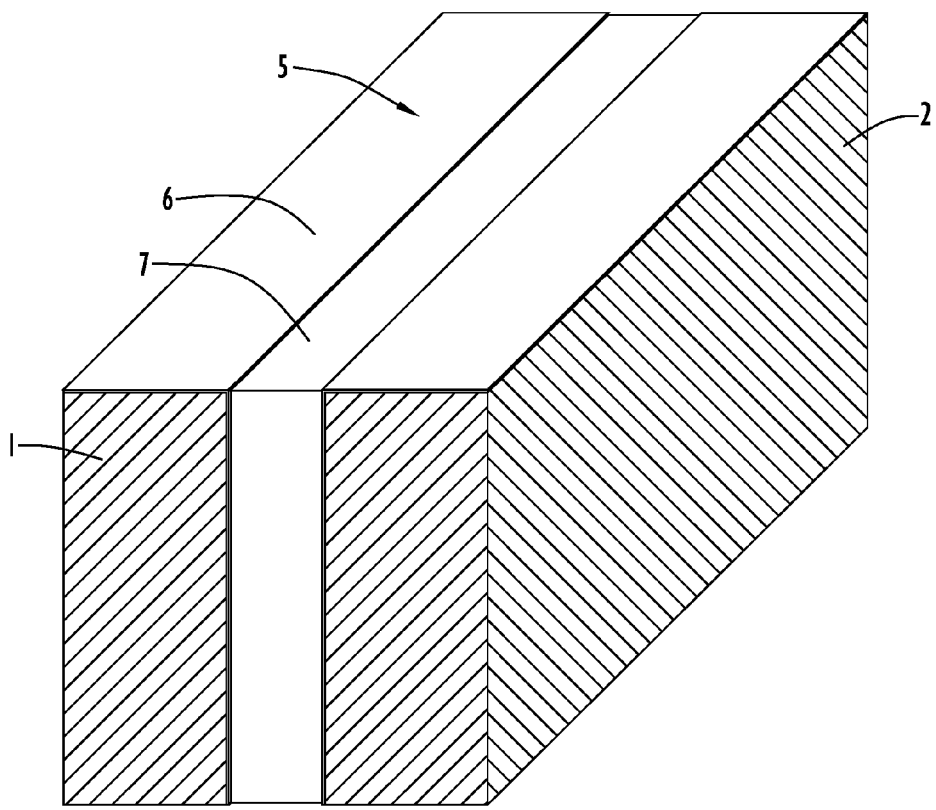

FIG. 4 shows sections of a movable 1 and a stationary 2 wafer section, created by deep etching a channel or gap 3 in an initial wafer. The deep etched sections 1, 2 are then insulated by, for example, growing an oxide layer 6 on the wafer surface. The deep etched channel or gap 3 is then filled with a conductive material 7, formed on the insulating oxide layer 6, as shown in FIG. 5.

Figure 6:
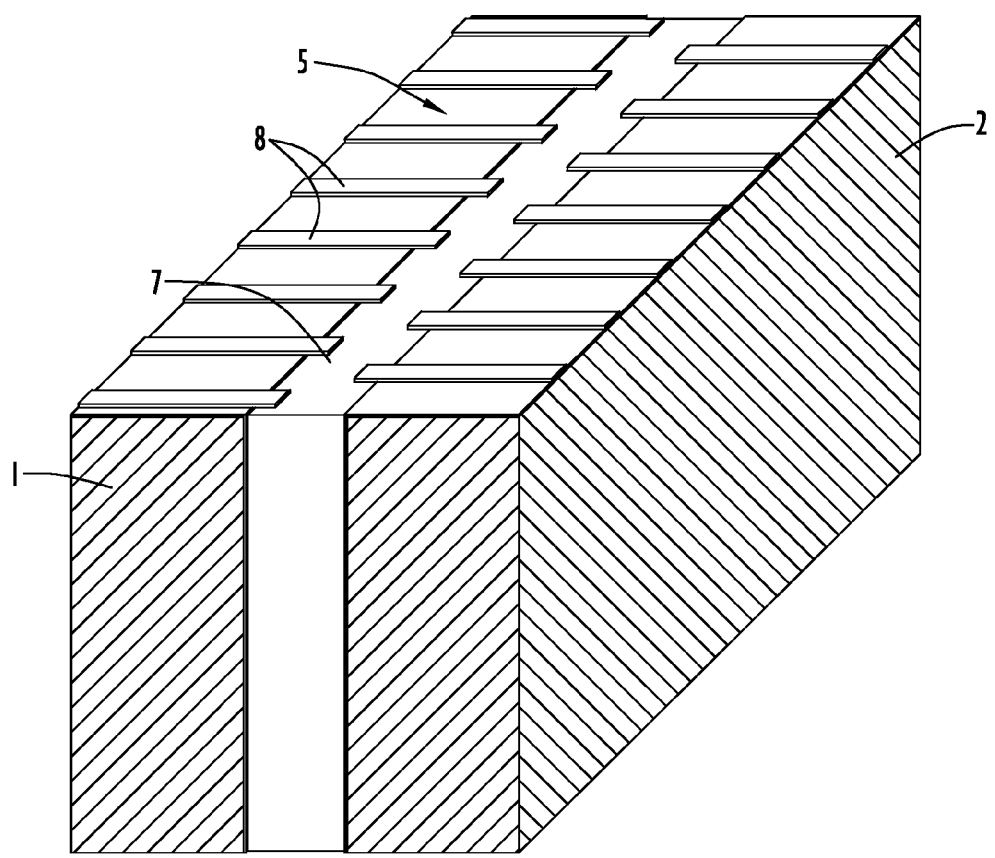

The top surfaces 5 of the wafer are then patterned with conductive material and processed to provide multiple separate conductors 8 that connect with the filled area of conductive material 7, as shown in FIG. 6.

Figure 7:
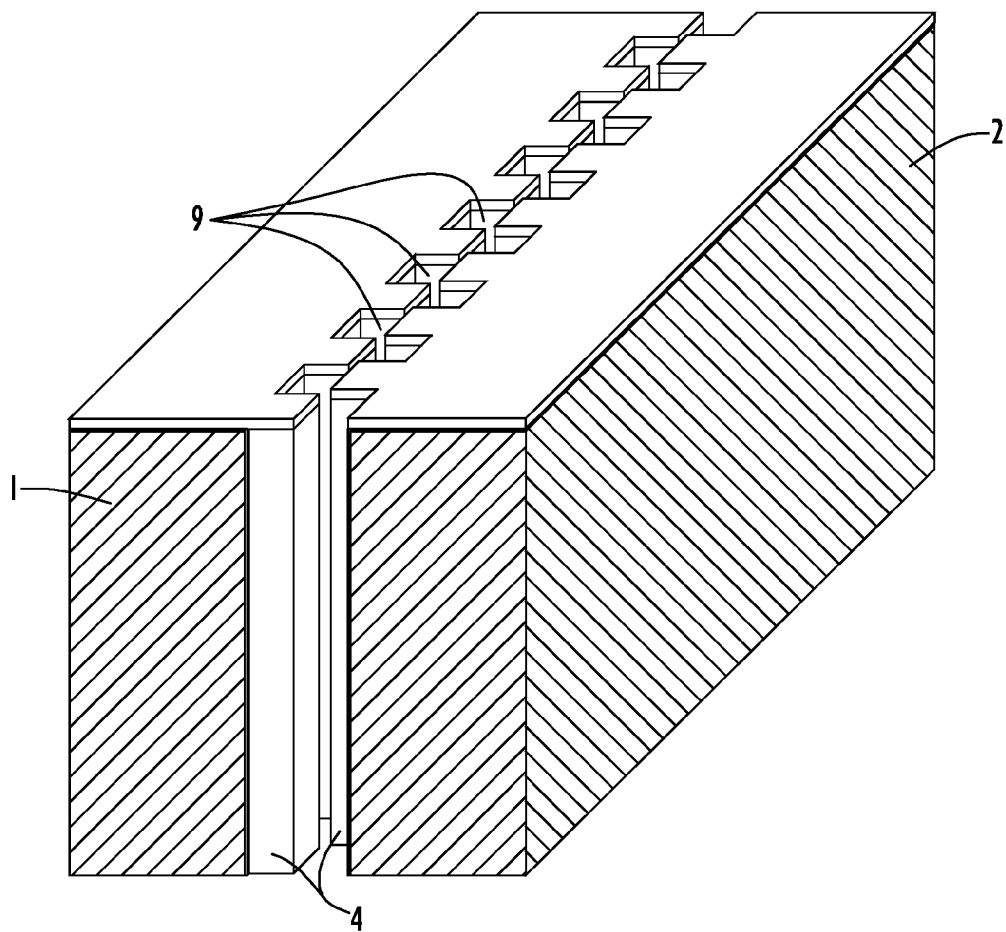

Referring to FIG. 7, the top surface 5 of the wafer sections is then masked and patterned. The conductive material 7 is deep etched it to created multiple recesses 9 in each wafer section 1, 2. The recesses 9 of the different sections 1, 2 are offset from one another, and may be also be chemically etched to round off any recess corners if required.

Figure 8:
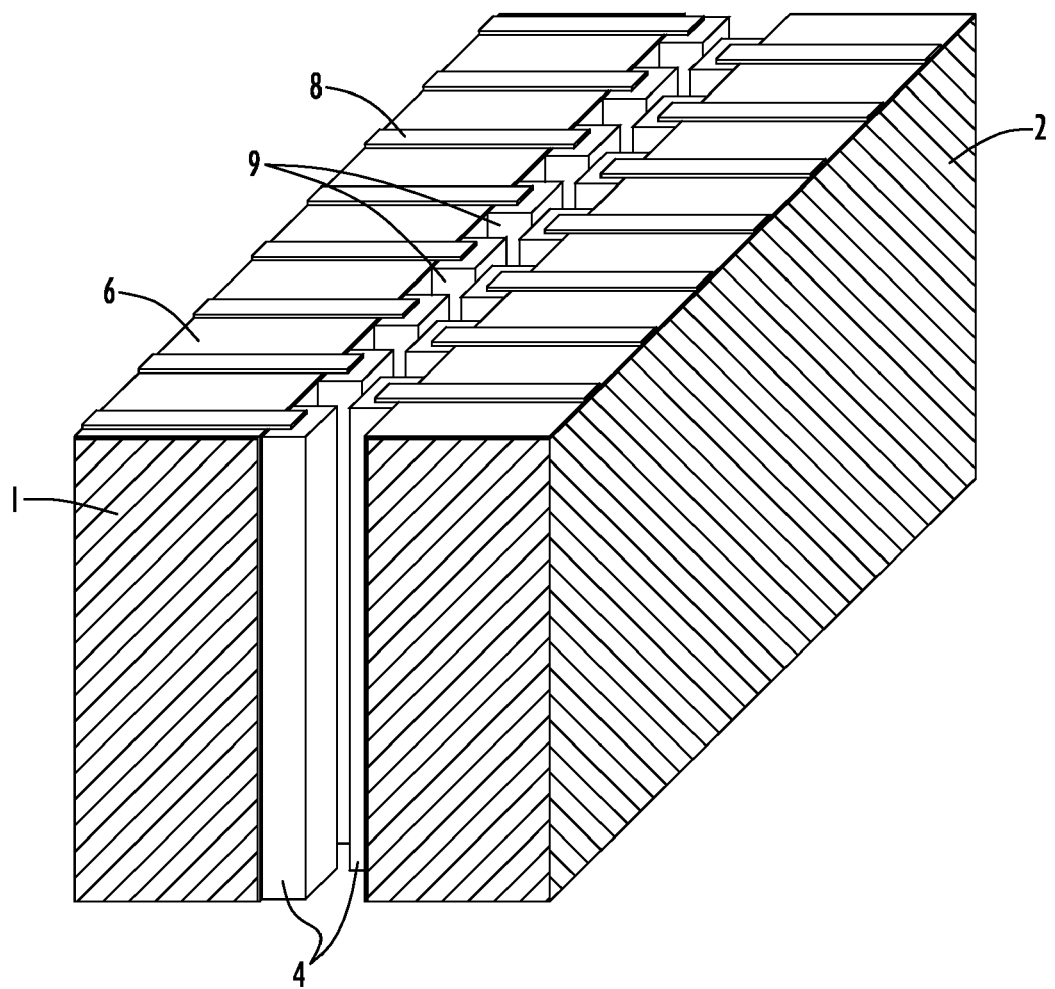

Referring to FIG. 8, the mask is removed. Vertical conductors 4 formed in the opening between the wafers act as capacitive elements, as described above.

Figure 9:
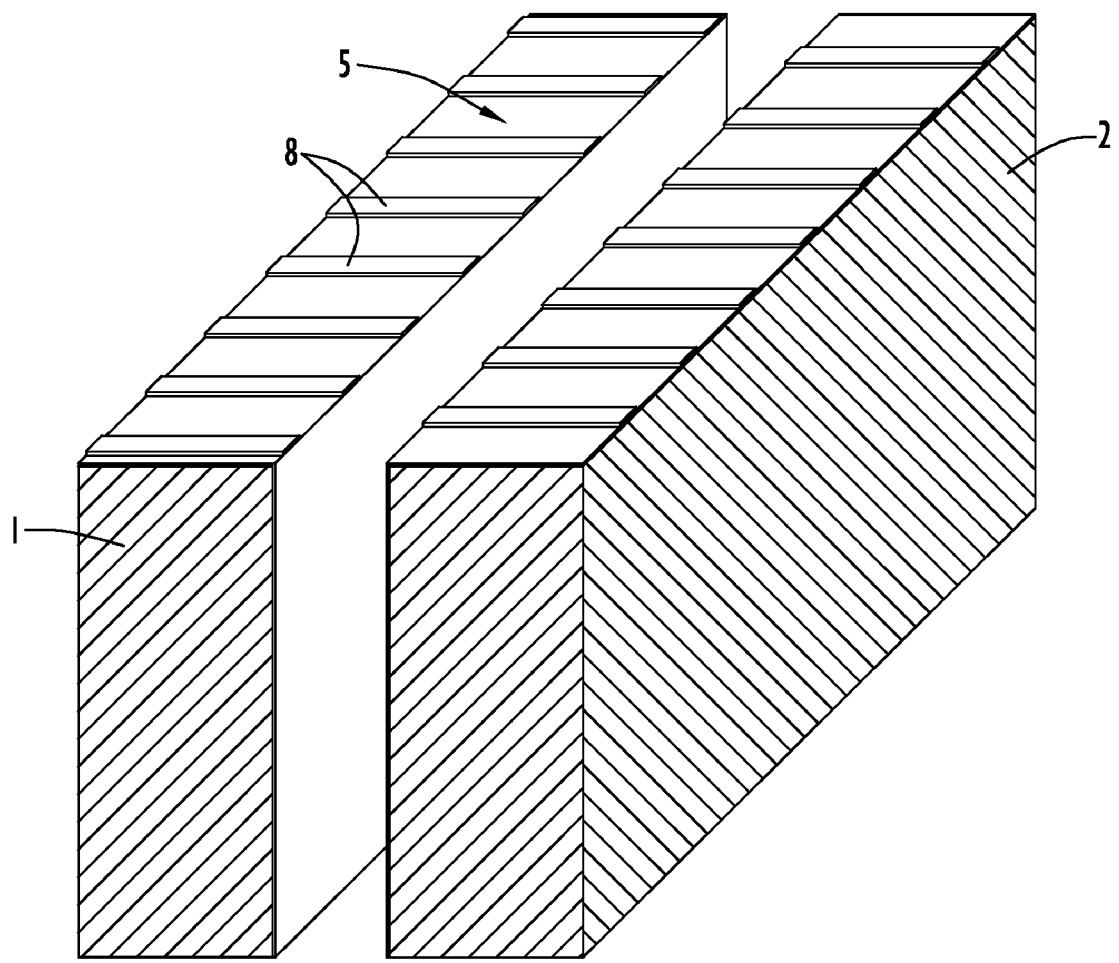
FIGS. 9 to 13 show perspective views of the structure of FIG. 3 during each step of an alternative manufacturing method according to the invention.

An alternative manufacturing method is shown in FIGS. 9 to 13. Firstly, the structure is finished as shown in FIG. 4. The top surfaces 5 of the wafer sections 1, 2 are then patterned with conductive material and processed to provide multiple separate top conductors 8 that extend to the edge of the deep etched gap 3, as shown in FIG. 9. A seed layer may then be applied, if required.

Figure 10:
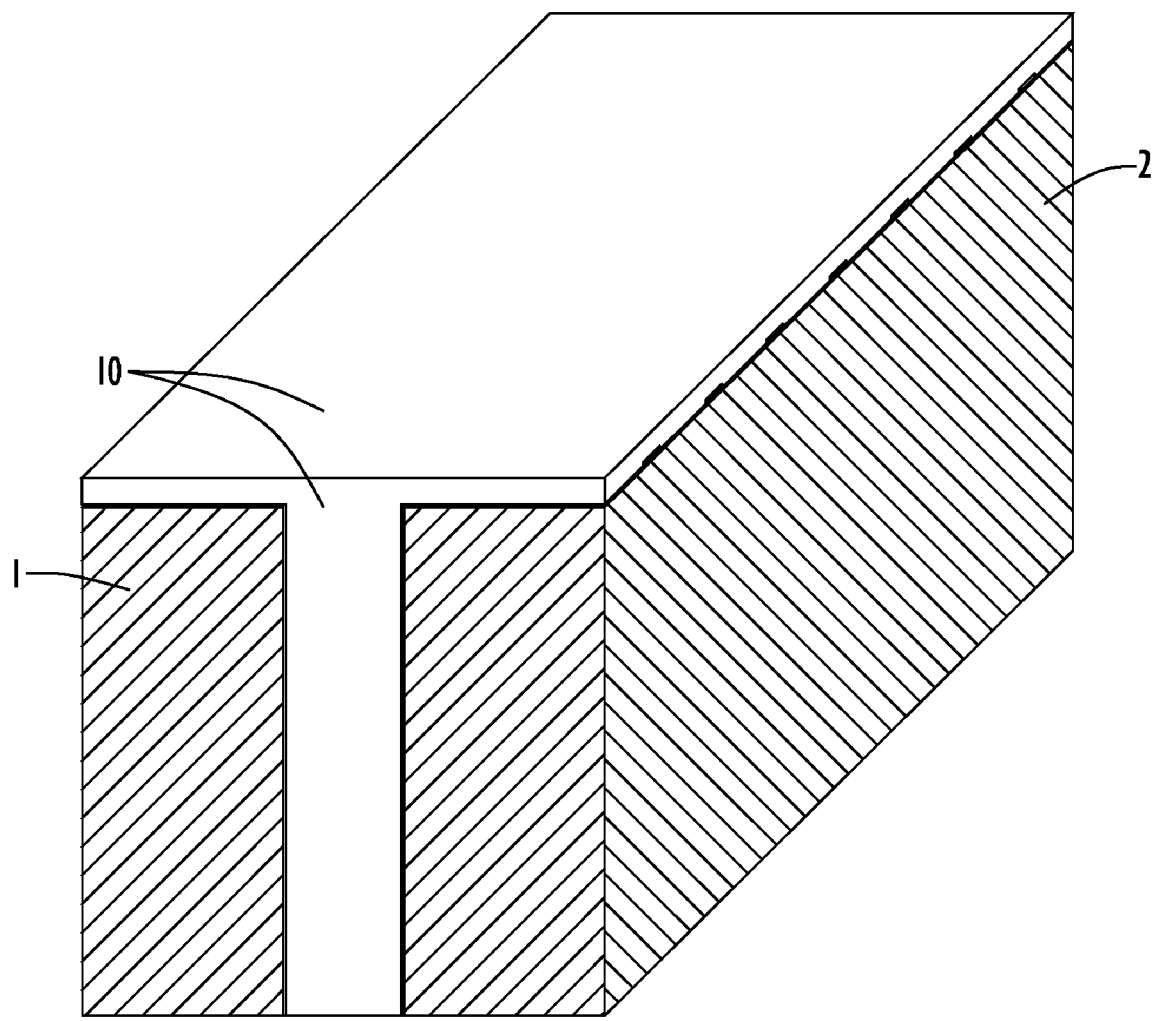
Figure 11:
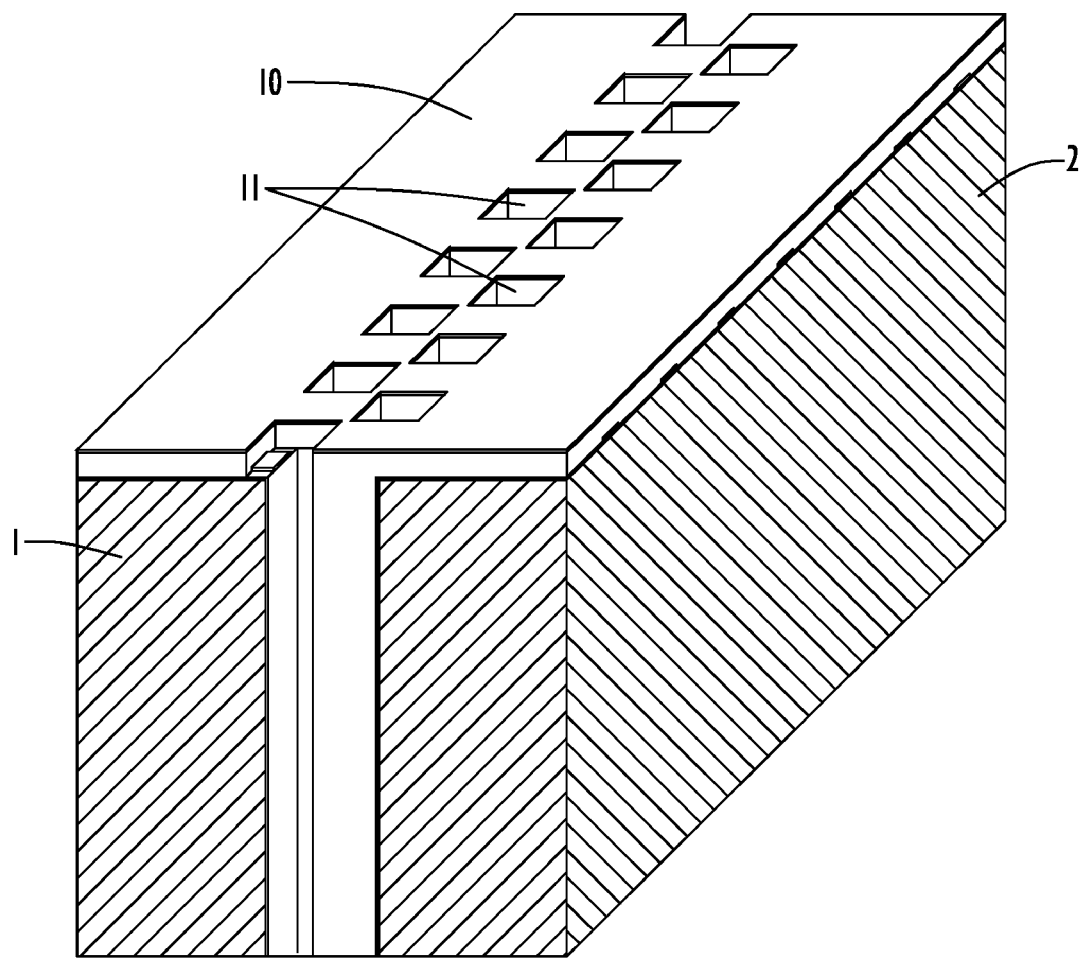

Referring to FIG. 10, the gap 3 is filled and the top surface covered with a polymer 10, which is then masked and patterned as shown in FIG. 11. The polymer layer 10 is then deep etched to make substantially vertical vias 11 through the polymer layer 10 and also to expose the ends of the top conductors 8. The polymer material may comprise, for example, photoresist materials, liquid plastics, or plasma deposit polymers.

Figure 12:
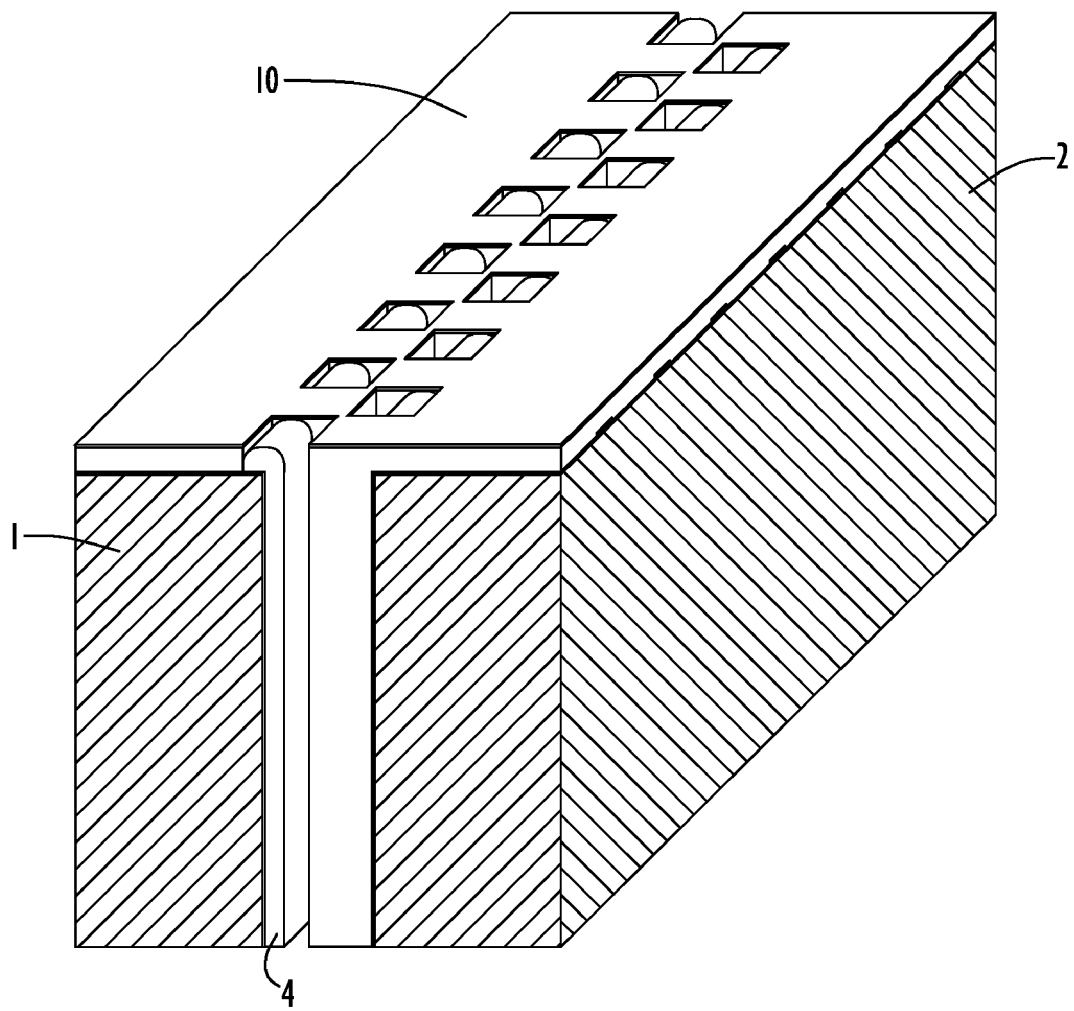
Figure 13:
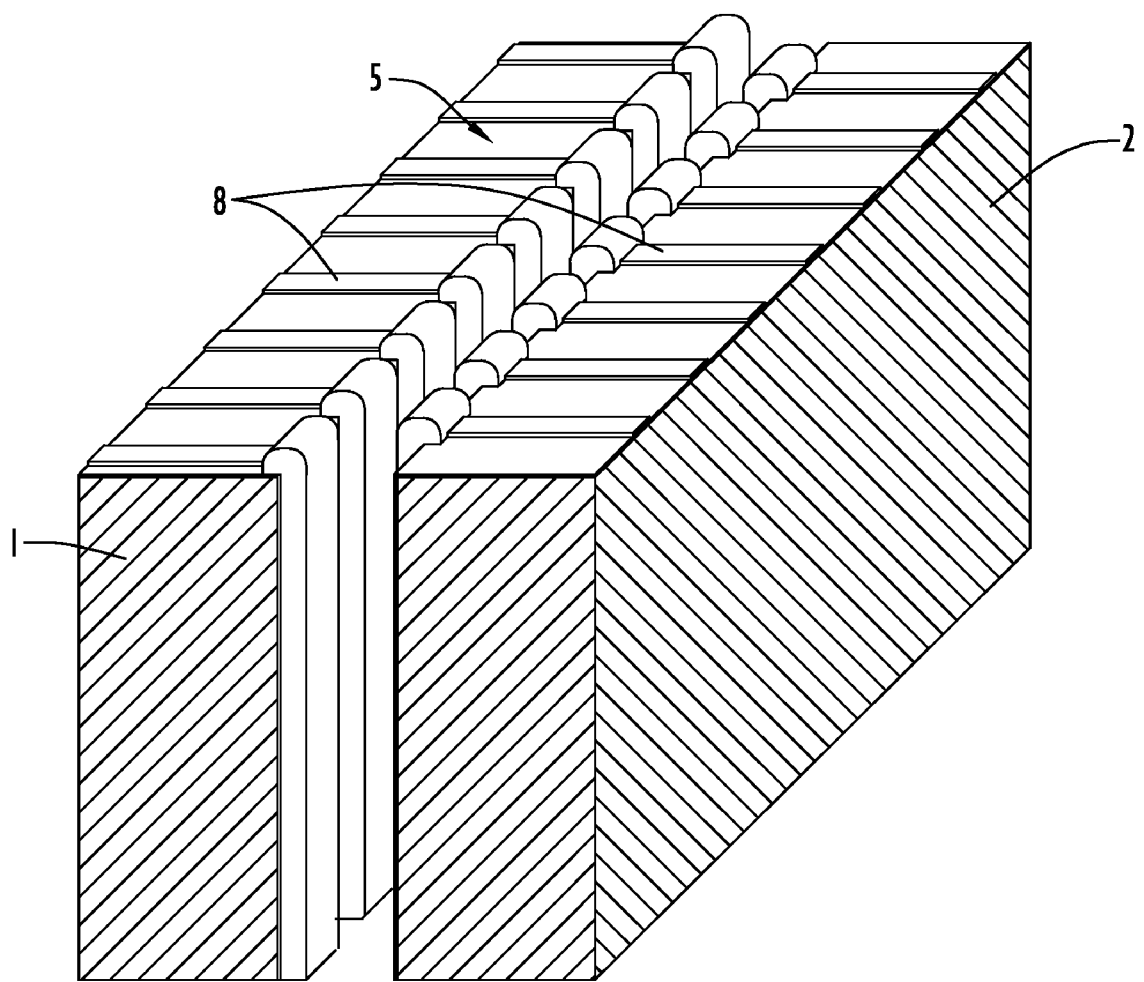

As shown in FIG. 12, the open surfaces of the vias 11 are then prepared for plating, if required, and are plated up to the required material thickness. The mask, the polymer layer 10 (and the seed layer, if applied), are then removed, leaving an opening in the MEMS structure that has vertical conductors 4 that act as capacitive elements, as shown in FIG. 13. Again, the conductors 4 on the different sections are staggered from one another.

Figure 14:
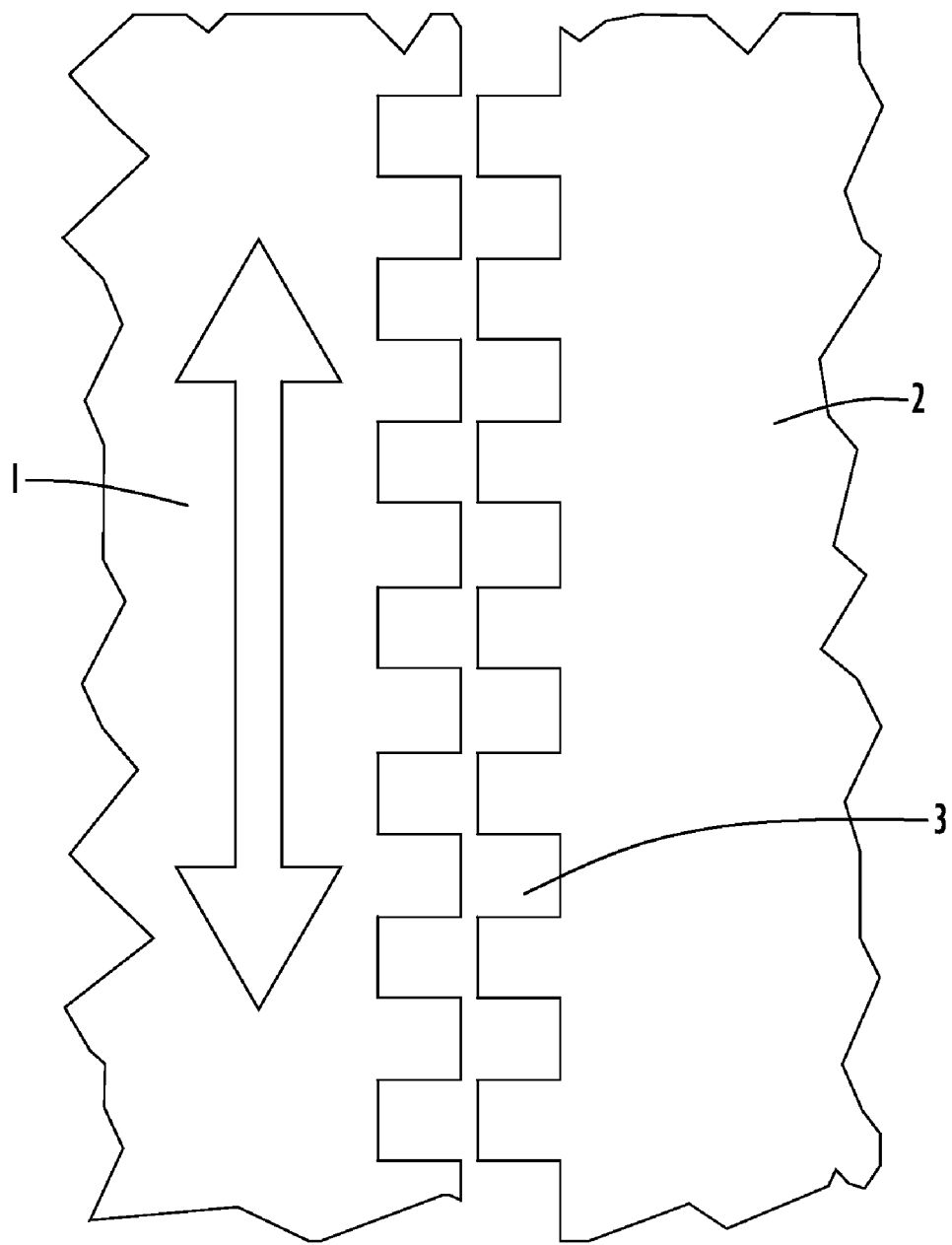
FIG. 14 is a plan view of a portion of a capacitive structure having a variable capacitor formed of moving and stationary wafer sections with staggered recesses, according to a further embodiment of the invention.
Figure 15:
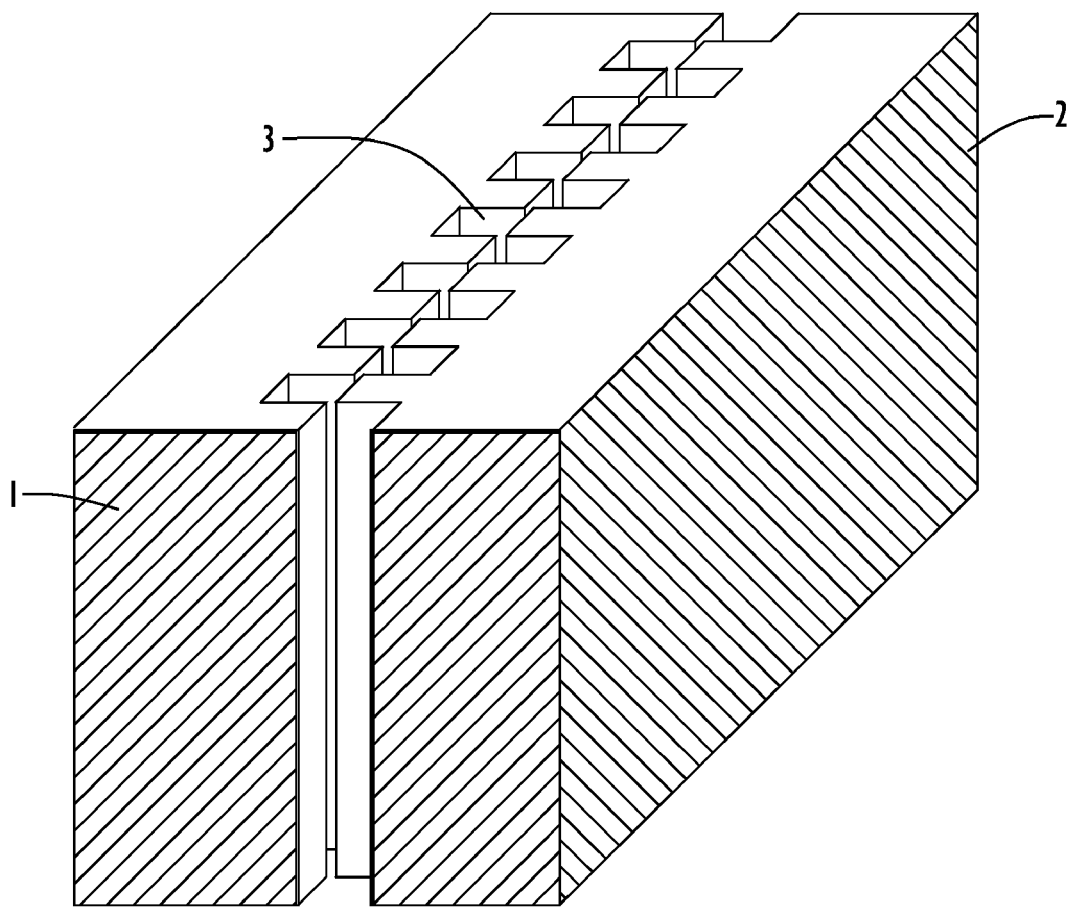
FIG. 15 is a perspective view of the capacitive structure of FIG. 14.

A further manufacturing method is shown in FIGS. 14 and 15.

Referring to FIG. 14, the wafer or layer can be deep etched directly to produce sections 1, 2 having a similar toothed and staggered profile as would otherwise be obtained by etching the filled in conductive material as described above. FIG. 15 shows a sectioned perspective view of the deep etched MEMS structure.

What is claimed is:

1. A method of manufacturing capacitive elements for a capacitive device comprising one or more layers, the method comprising:
    etching from a first surface to a second surface of at least one layer to form two sections of the layer, such that the sections are movable relative to one another, and such that a wall extending from the first surface to the second surface is formed on each of the two sections, the walls defining a gap therebetween; and
    etching to form a plurality of recesses in connection with each wall such that capacitive elements are respectively defined between adjacent recesses, the capacitive elements of one wall being offset from those of the other wall when the sections are stationary with respect to one another.

2. The method according to claim 1, further comprising providing an insulating layer on the walls formed between the first and the second surfaces.

3. The method according to claim 2, wherein providing an insulating layer comprises growing an oxide layer.

4. The method according to claim 1, further comprising providing conductive material on the walls to form the capacitive elements in the form of a plurality of electrical conductors, which are insulated from the at least one layer by the insulating layer, thereon, such that the gap defined by the walls is maintained.

5. The methods according to claim 4, wherein providing the conductive material includes:
    filling the gap between the walls with electrically conductive material; and
    etching the electrically conductive material to form the multiple electrical conductors.

6. The method according to claim 4, wherein providing the conductive material includes:
    filling the gap between the walls with a layer of polymer material;
    masking the polymer layer;
    etching the polymer layer to form multiple holes therein; and
    patterning the conductive material such that the multiple electrical conductors are provided in the holes.

7. The method according to claim 4, further comprising:
    patterning a plurality of conductive elements on at least one of the first and second surfaces, wherein the conductive elements are positioned to allow connection to the electrical conductors formed on the walls.

8. The method according to claim 7, the method further comprising:
    providing a layer of polymer material on at least one of the first and second surfaces; and
    etching the polymer layer such that the conductive elements patterned on at least one of the first and second surfaces are at least partially exposed.

9. A capacitive device, comprising:
    at least one layer having two sections that are movable relative to one another, wherein a wall extending from a first surface to a second surface of the layer is formed on each of the two sections, the walls defining a gap therebetween;
    wherein each section of the layer comprises a plurality of recesses in connection with each wall such that capacitive elements are respectively defined between adjacent recesses, the capacitive elements of one wall being offset from those of the other wall when the two sections are stationary with respect to one another.

* * * * *